United States Patent [19]
Swanson

[11] Patent Number: 5,295,021
[45] Date of Patent: Mar. 15, 1994

[54] TRIPLE EXTERIOR REARVIEW VEHICLE MIRROR

[75] Inventor: Arthur P. Swanson, 1454 Estate La., Glenview, Ill. 60025

[73] Assignees: Arthur P. Swanson; Jean M. Swanson, both of Rosemont, Ill. ; as Trustees of the Arthur S. Swanson Loving Trust

[21] Appl. No.: 47,997

[22] Filed: Apr. 19, 1993

[51] Int. Cl.$^5$ .................... B60R 1/06; G02B 5/08; G02B 7/18
[52] U.S. Cl. .................... 359/850; 359/865; 359/872; 248/479; 248/481
[58] Field of Search ............... 359/850, 854, 855, 856, 359/857, 861, 862, 863, 864, 865, 866, 872, 877; 248/479, 481, 482, 483, 484

[56] References Cited

U.S. PATENT DOCUMENTS

| | | | |
|---|---|---|---|
| 2,536,872 | 1/1951 | Cookson | 359/866 |
| 2,663,225 | 12/1953 | Blan . | |
| 3,480,350 | 11/1969 | Hamby | 359/866 |
| 3,712,715 | 1/1973 | Wagner | 359/507 |
| 3,826,563 | 7/1974 | Davis . | |
| 4,022,520 | 5/1977 | Scifres . | |
| 4,052,124 | 10/1977 | Marcus | 359/855 |
| 4,268,120 | 5/1981 | Jitsumori | 359/850 |
| 4,932,770 | 6/1990 | Caravaty | 359/866 |
| 5,052,792 | 10/1991 | McDonough . | |
| 5,153,781 | 10/1992 | Brandt . | |

FOREIGN PATENT DOCUMENTS

| | | | |
|---|---|---|---|
| 0475437 | 7/1951 | Canada | 359/855 |
| 0028860 | 5/1981 | European Pat. Off. . | |
| 0310261 | 4/1989 | European Pat. Off. . | |
| 2751878 | 5/1979 | Fed. Rep. of Germany . | |
| 3302735 | 8/1984 | Fed. Rep. of Germany | 359/866 |
| 2573374 | 5/1986 | France | 359/865 |
| 895855 | 5/1962 | United Kingdom . | |
| 1602384 | 11/1981 | United Kingdom | 359/865 |

*Primary Examiner*—Bruce Y. Arnold
*Assistant Examiner*—R. D. Shafer
*Attorney, Agent, or Firm*—Hill, Steadman & Simpson

[57] ABSTRACT

Rearview vehicle mirrors mountable on one or both sides of the vehicle to project laterally outward therefrom adjacent the windshield zone are provided with at least three independently adjustable flat faced mirrors movable in all planes to reflect to the driver's eyes rearward zones along the sides and rear of the vehicle which will simultaneously cooperate to provide the driver with a clear undistorted view of oncoming traffic all the way up to the driver's seat. Each mirror assembly has a compartment cup-shaped laterally elongated housing or casing with an open rearwardly facing mouth. Three flat faced mirrors fitting in side-by-side inboard, central and outboard relation in the housing substantially close the open mouth. Stiff ball and socket joints mount the mirrors in the housing to hold them in adjusted positions while permitting them to be manipulated in all planes either manually or electrically while maintaining the mouth of the housing substantially closed.

6 Claims, 3 Drawing Sheets

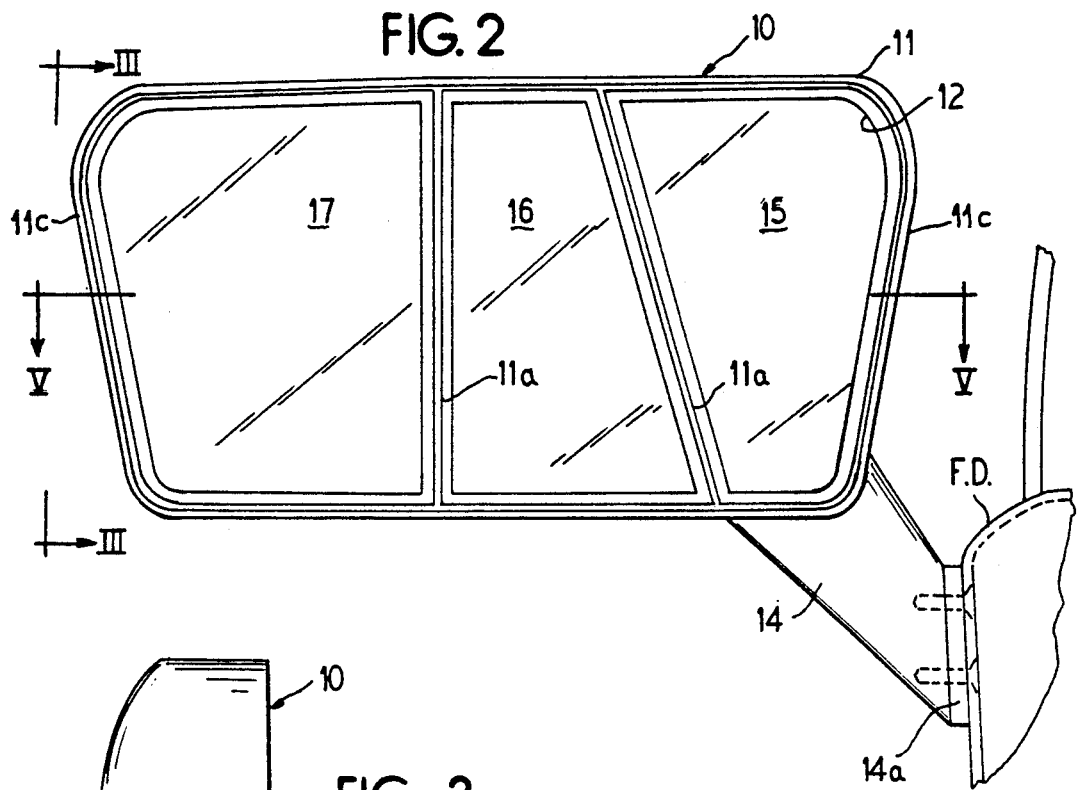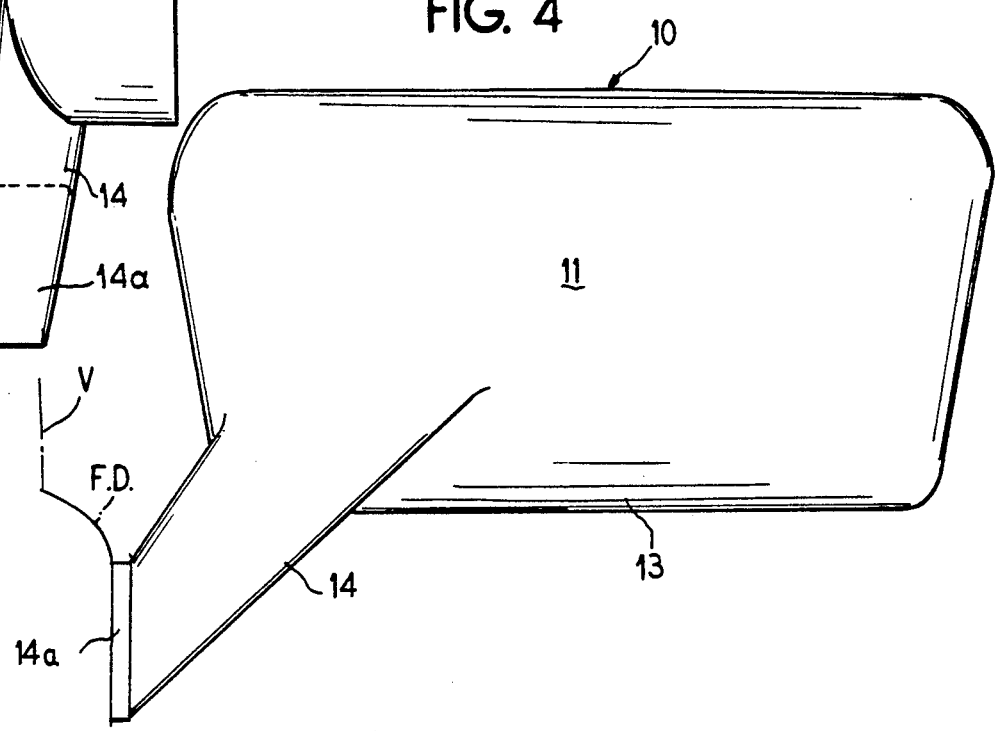

TRIPLE EXTERIOR REARVIEW VEHICLE MIRROR

BACKGROUND OF THE INVENTION

1. Field of the Invention

This invention relates to the art of exterior rearview vehicle mirrors which provide the driver of the vehicle at least three, full, clear, undistorted views of oncoming vehicles. Particularly the invention relates to external, laterally extending, rearview, mirrors on one or both sides of a vehicle forwardly of the driver's seat, outboard from the windshield zone and having three independently adjustable upright side-by-side mirrors movable in all planes to reflect to the driver's eyes, zones along both sides and rearwardly of the vehicle without any distortions or blind spots all the way up to the mirror itself which is positioned forwardly of the driver's eyes.

2. Prior Art

Heretofore known external rearview mirrors projecting laterally from the sides of the vehicle forwardly of the driver's seat and adjacent the windshield zone of the vehicle were not capable of providing a clear unobstructed, undistorted view of zones adjacent the sides at the rear of the vehicle and all the way up to the mirror itself. Blind spots were encountered especially in the areas where an oncoming vehicle in a side lane approaches, then overlaps, the rear of the vehicle and advances up to mirror. Attempts to minimize these blind spots with curved mirrors resulted in distortion which confused the driver and gave rise to accidents. Further, attempts to lessen the blind spots with twin side-by-side mirrors failed to clearly reflect zones where the oncoming vehicle is fully in a side lane just behind the vehicle all the way up to the plane of the mirror itself which is positioned ahead of the driver's eyes. Thus the outboard twin mirror could not be tilted to cover both the close approaching zone and the overlapped zone up to the mirror.

It would therefore be an improvement in this art to provide external rearview vehicle mirrors projecting laterally from the vehicle just forwardly from the driver's seat outward from the windshield zone which have three side-by-side adjacent inboard, central, and outboard upright mirrors which are independently adjustable in all planes to provide fields of vision to the driver, behind the vehicle, alongside the rear of the vehicle and then all the way up to the mirror itself ahead of the driver's seat.

It would be a specific improvement in this art to provide a cup-shaped casing or housing for mounting on one or both sides of a vehicle just forwardly from the driver's seat adjacent the windshield zone which encloses three side-by-side upright mirrors that are independently adjustable to provide the driver with unobstructed, undistorted, wide and longitudinally elongated views of oncoming traffic both to the sides and rear of the vehicle.

A specific feature of this invention is to laterally align upright, side-by-side, inboard, central, and outboard rearview vehicle mirrors each in its own compartment in a housing with at least the central and inboard mirror having adjacent edges inclined from the vertical to reflect overlapping views projecting outwardly adjacent the vehicle windshield from one or both sides of a vehicle with the mirrors being independently adjustable being in all planes to provide the driver with unobstructed vision of oncoming vehicles both to the sides and rear of the vehicle all the way up to the mirrors ahead of the driver's seat.

SUMMARY OF THIS INVENTION

According to this invention, automobile rearview mirrors of the type mounted on the sides of a vehicle closely forward from the driver's seat and outboard from the windshield zone of the vehicle are provided with upright inboard, central, and outboard laterally aligned mirrors that are adjustable in all planes to reflect side and rear, views of oncoming traffic without obstruction or distortion. The mirrors are mounted in an elongated cup-shaped casing or housing having partitions providing three separate side-by-side compartments with rearwardly facing mouths that are spanned by three side-by-side mirrors. These mirrors are swingable in all planes relative to the casing without projecting from the casing to expose the interior of the casing behind the mirrors.

The preferred mirror casing is substantially longer than high and sufficiently deep so that a mirror spans the open mouth of each compartment and can be substantially tilted at all planes without opening up gaps exposing the interiors of the casing. By way of example, the mirror casing can be streamlined to mate with the body styling of the vehicle and can be about 8 or 9 inches long and about 6 or 7 inches high. The inboard, central, and outboard mirrors are each mounted in their own individual compartment of the housing to span the rearwardly facing mouth of the compartment. A stiff ball and socket joint mounts each mirror in its compartment so that it may be forcibly tilted in all planes while holding the mirror in its desired adjusted position. Each mirror may be manually manipulated or actuated by conventional mechanical and electrical actuators.

The outboard mirror is preferably longer than each of the central and inboard mirrors to reflect the zone adjacent the driver's seat and the central and inboard mirrors have upright inclined adjacent sides each providing relatively wider and narrower tops and bottoms. The central mirror has a narrow top diverging to a wider bottom while the inboard mirror has a wider top than bottom mating with the central mirror. The outboard mirror and central mirror can have adjacent edges inclined from the vertical to reflect overlapping zones alongside the vehicle.

This preferred inclined mating mirror arrangement provides overlapping reflecting areas to merge at least two of the three zones. In a mirror assembly of 8 or 9 inches in length the central mirror can be 1 to 3 inches wide with a top width of 1 to 2 inches and a bottom width of 2 to 3 inches. The corresponding outboard mirror can be 3 to 5 inches, wide with a top width of 4 to 5 inches and a bottom width of 3 to 4 inches. The inboard and outboard mirrors mating with the central mirror can be 3 to 5 inches wide with the top ends wider than the bottom ends. The innermost side of the inboard mirror and the outermost sides of the outboard mirror converge downwardly toward each other.

The ball joint mountings for the mirrors have tight fitting ball and sockets to resist unauthorized movement.

A preferred embodiment of the invention is shown in the attached three sheets of drawings in which:

FIG. 1 is a diagrammatic top plan view of a vehicle equipped with the triple mirrors of this invention on both sides of the vehicle and showing the vehicle in the center lane of a three lane highway illustrating the manner in which an oncoming vehicle in all lanes is visible to the driver without distortion or blind spots as the oncoming vehicle approaches the rear of the vehicle and advances in the side lanes from the rear of the vehicle all the way up to the mirror itself ahead of the driver's seat.

FIG. 2 is a front elevational view of one of the mirrors shown in FIG. 1 taken substantially along the line 11—11 of FIG. 1.

FIG. 3 is an end elevational view of the mirror of FIG. 2 taken along the line 111—111 of FIG. 2.

FIG. 4 is a back elevational view of the mirror of FIGS. 2 and 3.

AS SHOWN ON THE DRAWINGS

Figure 1:
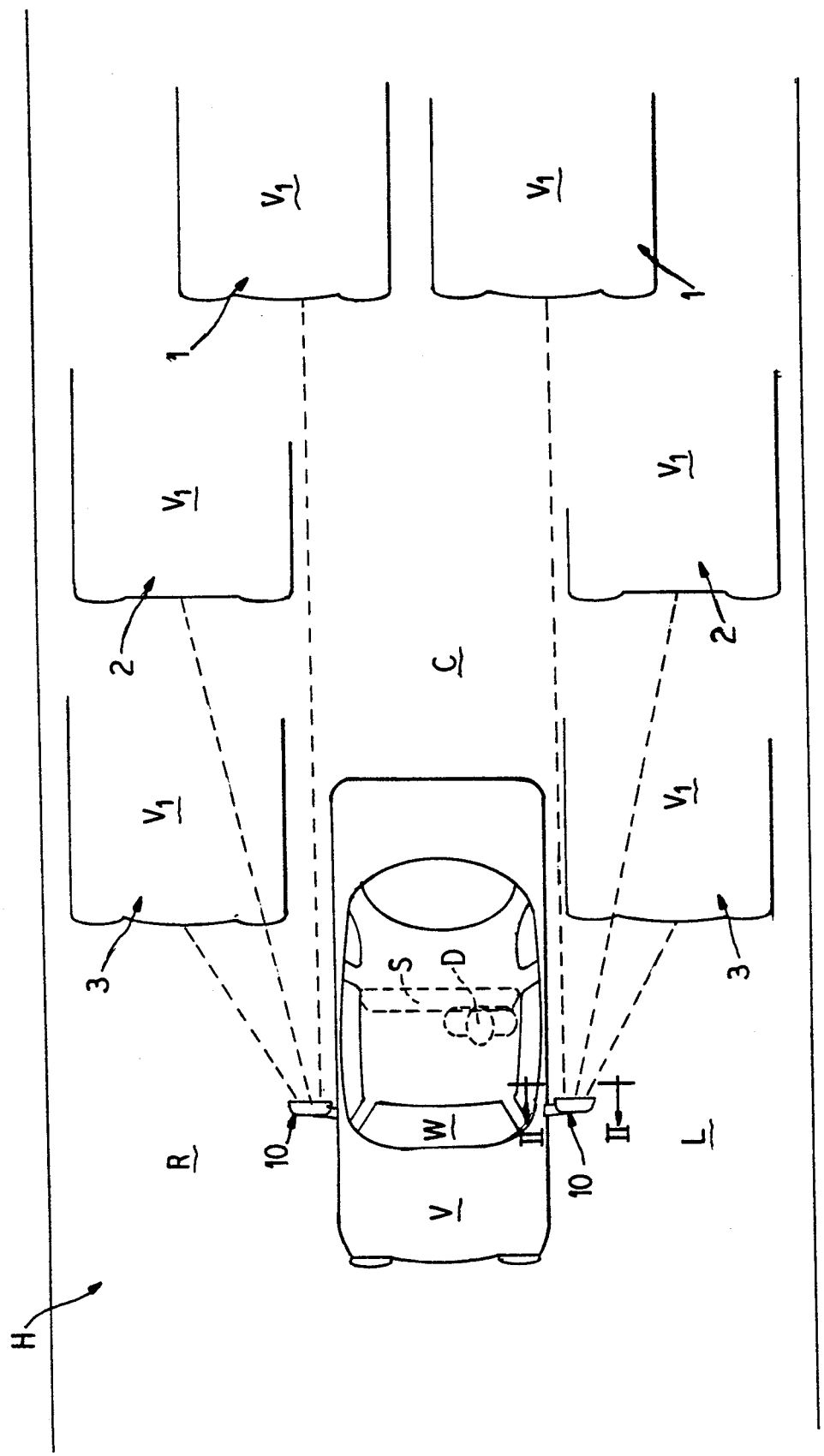
Figure 5:
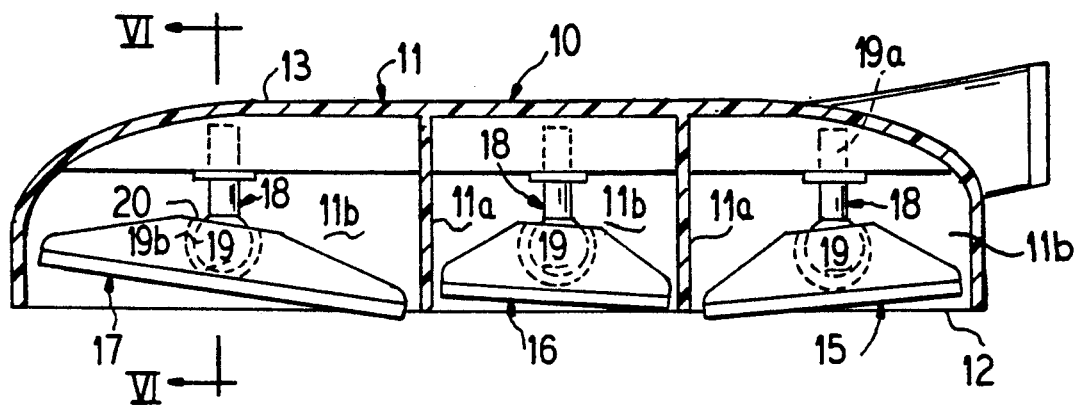
FIG. 5 is a longitudinal sectional view along the line V—V of FIG. 2 with the mirrors inclined to reflect the three zones of the approaching vehicle as shown in FIG. 1.
Figure 6:
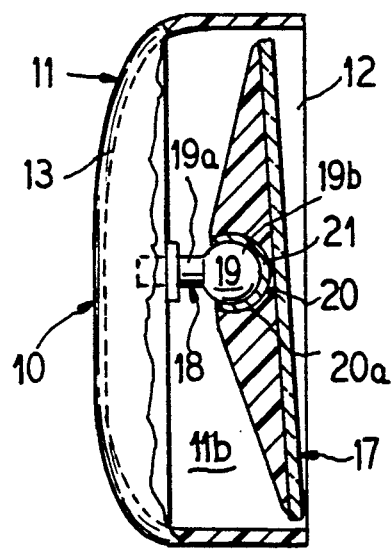
FIG. 6 is a transverse sectional view generally along the line VI—VI of FIG. 5 illustrating the depths of views to the driver afforded by the vertical tilting of a mirror.

As shown in FIG. 1 the reference numerals 10, 10 illustrate mirrors of this invention mounted on and projecting laterally from both sides of an automotive vehicle V in the center lane C of a three lane highway H including a right hand lane R and a left hand lane L. A driver's seat S in the vehicle is positioned rearwardly but relatively close to the windshield W of the vehicle. A driver D in the seat S has unobstructed forward and lateral vision of the mirrors 10, 10 mounted on both sides of the vehicle outboard from the windshield zone. A vehicle $V_1$, is illustrated in two positions 1, 1 leaving the center lane C as it approaches the rear of the vehicle V into either the right lane R or the left lane L. The vehicle V, then advances from position 1 to position 2 in a lane R or L just behind vehicle V. Next the vehicle $V_1$, advances from position 2 to position 3 in the lane R or L. As shown the triple mirrors 10 pick up unobstructed views of each position 1, 2 and 3 of the vehicle $V_1$.

As hereinafter more fully described, the driver D thus has full unobstructed and undistorted merging views of all three positions of the vehicle and all the way up to the driver's seat.

As shown in FIGS. 2-6, each mirror 10 has a cup-shaped housing 11 with an open rearwardly facing mouth 12, a backwall 13 and a depending leg 14 with an integral foot or flange 14a secured to the outside of a front door F.D. of the V from the inside of the door.

The housing has two central partition walls 11a, dividing the cup into three side-by-side compartments 11b. The cup-shaped housing 11 is generally rectangular or oval shaped with the longitudinal length greater than the transverse height to extend laterally from each side of the vehicle for a substantial distance. The housing is preferably longer at the top than bottom with its ends 11c converging downwardly toward each other.

Each compartment 11b houses an upstanding mirror thus providing an inboard mirror 15, a central mirror 16, and an outboard mirror 17 in side-by-side relation with reflecting areas sufficiently outward from the vehicle to provide the driver D with rear views of oncoming traffic in all three zones as illustrated in FIG. 1. The mirrors 15, 16 and 17 have flat faces and are shaped and sized to fit in their compartments alongside each other within the open mouth 12 of the casing in closely spaced relation to the casing.

Each mirror 15, 16 and 17 is mounted in the housing 11 on a friction type ball and socket joint 18 including a ball member 19 and a socket member 20. The ball member 19 has a shank 19a fixed to the back of the casing and a ball end 19b seated in the ball socket 20a of the mirror socket member 20. A plastic cup 21 tightly embraces the ball 19b and is embraced by the socket 20a of the socket member 20 to provide a tight friction fit between the ball stud 18 and socket 20. Each mirror 15, 16 and 17 is thus firmly mounted within the casing 11 to span and substantially close the open mouth 12 of the casing. Each mirror is swingable in all planes about the ball 19b. The mirrors can be adjusted by hand or by independent Bowden wires, cables or electrical actuators as are available in the known art.

The triple mirrors 15, 16 and 17 are individually adjusted in their compartments 11b in all planes without exposing the interiors of the housing to reflect all three positions of the vehicle $V_1$, as shown in FIG. 1. Thus the inboard mirrors 15 can be positioned to provide angles of incidence from the driver's eyes to provide angles of reflection which show a rear vehicle V, in position 1 turning either to the right or left into a side lane. The central mirror 16 can be positioned to reflect position 2 of vehicle V, in the either lane as it closely approaches the rear of the vehicle V to pass the vehicle while the outboard mirror 17 can be simultaneously positioned to show position 3 of the vehicle in either lane after it advances beyond the rear of the vehicle V all the way up to the mirror itself ahead of the driver's seat.

It will be understood that the triple mirrors cooperate to reflect all three positions 1, 2 and 3 of the vehicle V, on both sides of the vehicle V with each mirror 15, 16 and 17 individually reflecting zones that cannot be fully seen by the others.

Further, it will be understood that three mirrors are essential to scan these zones within a total mirror length that does not create a troublesome projection on the vehicle.

The feature of providing at least the central and inboard mirror with adjacent edges inclined from the vertical provides mating wide and narrow top and bottom portions which overlap the zones which they reflect while the feature of providing the outboard mirror with a wider top than bottom increases the reflecting zone all the way up to the driver's eyes.

It will be understood that the mirrors of this invention are suitable for both original vehicle equipment and accessory equipment.

Although I have described my invention by reference to particular illustrative embodiments thereof, many changes and modifications of the invention may become apparent to those skilled in the art without departing from the spirit and scope of the invention. I therefore intend to include within the patent granted on this application all such changes and modifications as may reasonably and properly be included within the scope of my contribution to the art.

I claim:

1. A rearview mirror for extending laterally outward from the sides of a vehicle adjacent the windshield zone in front of the driver which comprises a cup-shaped housing with a rearwardly facing open mouth, three side-by-side upright flat mirrors spanning said mouth of the housing sized and shaped to substantially close said mouth and providing a central mirror between an inboard and an outboard mirror, a ball and socket joint mounting each mirror in the housing, means for frictionally resisting movement of each joint, said mirrors cooperating together to provide the driver with clear undistorted unobstructed views of oncoming traffic both to the rear and sides of the vehicle all the way up to the driver, said cup-shaped housing having two dividing walls in the housing dividing the interior and mouth of the housing into three side-by-side compartments, the dividing wall between the inboard and central mirror being inclined from the vertical, and the adjacent mirrors having mating sides on both sides of said dividing wall between the inboard and central mirror.

2. A rearveiw mirror for extending laterally outward from the sides of a vehicle adjacent the windshield zone in front of the driver which comprises a cup-shaped housing with a rearwardly facing open mouth, three side-by-side upright flat mirrors spanning said mouth of the housing sized and shaped to substantially close said mouth and providing a central mirror between a inboard and an outboard mirror, a ball and socket joint mounting each mirror in the housing, means for frictionally resisting movement of each joint, said mirrors cooperating together to provide the driver with clear undistorted unobstructed views of oncoming traffic both to the rear and sides of the vehicle all the way up to the driver, and said central mirror being wider at the bottom than at the top.

3. A rearview mirror for extending laterally outward from the sides of a vehicle adjacent the windshield zone in front of the driver which comprises a cup-shaped housing with a rearwardly facing open mouth, three side-by-side upright flat mirrors spanning said mouth of the housing sized and shaped to substantially close said mouth and providing a central mirror between an inboard and an outboard mirror, a ball and socket joint mounting each mirror in the housing, means for frictionally resisting movement of each joint, said mirrors cooperating to provide the driver with clear undistorted unobstructed views of oncoming traffic both to the rear and sides of the vehicle all the way up to the driver, and said inboard and outboard mirrors being wider at the tops than at the bottoms.

4. An exterior rearview mirror, means mounting said mirror to project laterally from one or both sides of a vehicle adjacent the driver forwardly of the driver's eyes, said mirror having a cup-shaped housing with a rearwardly facing open mouth, three mirrors mounted in the housing in horizontal side-by-side relation inwardly from said mouth, a universal joint mounting each mirror in the housing accommodating independent universal movement of the mirror in the mouth of the housing, means holding the mirrors in adjusted relationship, and said cup-shaped housing having a separate compartment for each mirror with a central compartment being wider at the bottom than at the top.

5. A rearview mirror, means for mounting said mirror on the outside of a vehicle to project laterally outward therefrom closely adjacent the vehicle driver forwardly of the driver's eyes, said mirror having a cup-shaped housing with a rearwardly facing open mouth, at least three laterally aligned mirror units in horizontal side-by-side relation providing an inboard unit, a central unit, and an outboard unit, means mounting each of said units for independent universal adjustment in all planes, means holding said mirrors in selected adjusted position to reflect full unobstructed views of oncoming traffic behind and to the sides of the vehicle all the way up to the driver's eyes, and the central mirror unit being wider at the bottom than at the top.

6. A rearview mirror, means mounting said mirror for extending laterally outward from the sides of a vehicle adjacent the windshield zone in front of the driver forwardly of the driver's eyes, said mirror having a cup-shaped housing with a rearwardly facing open mouth, said cup-shaped housing having two upstanding dividing walls dividing the interior and mouth of the housing into three side-by-side compartments, three horizontally aligned side-by-side upright flat mirrors spanning said mouth of the housing sized and shaped to substantially close said mouth and providing a central mirror between an inboard and an outboard mirror, means independently mounting each mirror in a compartment for universal movement relative to said housing, said dividing wall between the inboard and central mirror being inclined from the vertical, and the mirrors adjacent said inclined dividing wall having mating sides on both sides of said dividing wall.

* * * * *

UNITED STATES PATENT AND TRADEMARK OFFICE
CERTIFICATE OF CORRECTION

PATENT NO. : 5,295,021
DATED : March 15, 1994
INVENTOR(S) : Arthur P. Swanson

It is certified that error appears in the above-indentified patent and that said Letters Patent is hereby corrected as shown below:

Column 3, line 4 "spotsas" should read --spots as--.

Column 3, line 52 "the V" should read --the vehicle V--,

Column 5, line 23 "between a" should read --between an"

On the title page, item [57] Abstract : line 10, "compartment" should read --compartmented--.

This certificate supersedes Certificate of Correction issued January 9, 1996.

Signed and Sealed this

Thirtieth Day of April, 1996

Attest:

BRUCE LEHMAN

Attesting Officer          Commissioner of Patents and Trademarks